United States Patent
Jewkes et al.

(10) Patent No.: US 11,733,753 B2
(45) Date of Patent: Aug. 22, 2023

(54) SYSTEMS AND METHODS FOR CONTROLLING POWER TO A PLATFORM MODULE

(71) Applicant: Rivian IP Holdings, LLC, Plymouth, MI (US)

(72) Inventors: Rachel Jewkes, Irvine, CA (US); Kyle Lobo, Westchester, CA (US); Aaron Weast, Portland, OR (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/379,044

(22) Filed: Jul. 19, 2021

(65) Prior Publication Data

US 2023/0015825 A1   Jan. 19, 2023

(51) Int. Cl.
*H02J 9/00* (2006.01)
*B60L 55/00* (2019.01)
*B60L 53/60* (2019.01)
*G06F 1/26* (2006.01)

(52) U.S. Cl.
CPC .............. *G06F 1/266* (2013.01); *B60L 53/60* (2019.02); *B60L 55/00* (2019.02); *H02J 9/002* (2013.01); *H02J 2310/40* (2020.01)

(58) Field of Classification Search
CPC .......... G06F 1/266; B60L 53/60; B60L 53/80; B60L 55/00; B60L 1/00; B60L 1/006; B60L 1/08; B60L 3/0038; H02J 9/002; H02J 2310/40; H02J 2310/48; H02J 3/322
See application file for complete search history.

(56) References Cited

U.S. PATENT DOCUMENTS

| | | | |
|---|---|---|---|
| 2003/0234550 A1* | 12/2003 | Brooks | B60N 2/793 296/24.46 |
| 2004/0026947 A1* | 2/2004 | Kitano | B60R 11/0235 296/24.34 |
| 2016/0114891 A1 | 4/2016 | Pajic | |
| 2017/0341526 A1* | 11/2017 | Marlia | B60L 3/0046 |
| 2018/0373289 A1 | 12/2018 | Sultenfuss et al. | |
| 2020/0130933 A1* | 4/2020 | Mattern | B25J 19/0054 |
| 2021/0138919 A1* | 5/2021 | Weber | H01R 13/6205 |

\* cited by examiner

*Primary Examiner* — Lincoln D Donovan
*Assistant Examiner* — Alex W Lam
(74) *Attorney, Agent, or Firm* — Haley Guiliano LLP

(57) ABSTRACT

A platform module having switchable power for a vehicle including a movable member capable of achieving multiple positions and a position sensor. The movable member includes a plurality of ports configured to provide power. The position sensor is configured to detect a position of the movable member. A first port from the plurality of ports is configured to provide power when the movable member is in a first position; and a second port from the plurality of ports is configured to provide power in response to detecting that the movable member is in a second position. Further, a method is provided for switching power to the platform module.

20 Claims, 12 Drawing Sheets

SYSTEMS AND METHODS FOR CONTROLLING POWER TO A PLATFORM MODULE

INTRODUCTION

The present disclosure is directed towards a platform module for a vehicle, and more particularly, towards controlling power to a platform module that is accessible from a storage of the vehicle.

Vehicles used for off-road and sporting purposes may serve as transportation, provide shelter, and provide power to accessories for recreation. While some accessories for recreation may require continuous electricity (e.g., refrigerator), other accessories may not need power while being stowed (e.g., water pump). It would be advantageous for a vehicle to provide integrated controllable ports to provide power.

SUMMARY

In some embodiments, the present disclosure is directed to a platform module to control power for a vehicle. The platform module includes a member, a first port and a second port. The member is configured to achieve multiple positions. In some embodiments, the member is a movable member. In some embodiments, the movable member may be configured to slide on a rail system disposed in a storage compartment. In some embodiments, the movable member is affixed to a frame and the vehicle, and is configured to allow the frame to move relative to the vehicle. In some embodiments, the movable member may be mounted on the frame and may include a countertop positioned on top of the frame, a plurality of ports disposed on the countertop and a leg member configured to pivot around an end of the frame and provide support to at least some of the member. Each port of the plurality of ports may provide power. For example, a first port may provide 110 volts to accessories coupled to the first port. In another example, a second port may provide 12 volts to accessories coupled to the second port. The movable member may also include a position sensor. The position sensor may be mounted to a rail or on a side wall or any other mountable location in the storage compartment to permit the platform module to be extracted or retracted. The position sensor detects the position of the member. For example, the member may be in a first position, for example, in a stowed position, with the member retracted into the storage compartment of the vehicle. In another example, the member may be in a second position in a deployed position, with the member extended out of the storage compartment of the vehicle. In some embodiments, a first port from the plurality of ports is configured to provide power when the member is in a first position. For example, the first port provides power when the platform module is stowed. In some embodiments, a second port from the plurality of ports is configured to provide power in response to detecting that the member is in a second position. For example, the second port provides power when the module is deployed. The platform module provides flexibility for use of versatile accessories (e.g., kitchen accessories, water pump, refrigerator, etc.). That is, accessories that require power (e.g., refrigerator) may be connected to an unswitchable port and accessories that do not require power when stowed may be connected to the switchable ports.

In some embodiments, the first port and the second port are configured to output different voltages. For example, the first port outputs 110 volts and the second port outputs 12 volts.

In some embodiments, the vehicle includes an electrical extension connecting an electric power source of the vehicle to the platform module. In some embodiments, the electrical power source is from an external power source connected to the vehicle via an extension wire. In some embodiments, the vehicle is an electric vehicle and the electric power source of the vehicle includes a battery module that also provides power to an electric drivetrain of the vehicle. In some embodiments, the electrical extension is coupled to at least one of an actuator of to extend and retract the platform module and a platform module to provide power. In some embodiments, each port of the plurality of ports is coupled by an electric wire system to a vehicle battery.

In some embodiments, the vehicle further includes a sensor to monitor a battery storage level of the vehicle battery. Based on the storage level of the vehicle battery dropping below a threshold storage level (e.g., 30 percent of fully charged vehicle battery), the vehicle may turn off power to the second port. The threshold storage level may be a variable threshold based on the location of the vehicle and the distance to a charging station. For example, if a charging station is very close to the vehicle (e.g., 10-minute drive), the threshold storage level may be adjusted to 20% of a fully charged vehicle battery. In another example, if the vehicle is in a remote location, identified by GPS tracking, the threshold storage level may be adjusted to a higher value to permit the vehicle to drive to a charging station. In some embodiments, the vehicle turns off the power to the port in response to the battery storage level dropping below the threshold storage level.

In some embodiments, the vehicle further includes a load usage sensor to monitor the power consumption of the plurality of ports. For example, the load usage sensor may monitor the load for each port of the plurality of ports. Based on the power consumption (i.e., load to all of the ports) being greater than a consumption threshold (e.g., 220 volts) and the battery storage level of the vehicle battery dropping below a threshold storage level (e.g., 30 percent of fully charged vehicle battery), the vehicle may turn off power to the first port.

In some embodiments, the vehicle may include a proximity sensor. The proximity sensor may track a distance of a user relative to the vehicle. For example, if the user is too far from the vehicle. The vehicle may identify that the distance of the user is greater than a threshold distance (e.g., a distance of 100 feet or 500 feet). In some embodiments, the vehicle may turn off power to the plurality of ports in response to the proximity sensor identifying that the distance of the user is greater than a distance threshold.

In some embodiments, the vehicle may monitor a battery storage level at a vehicle battery. Based on the battery storage level of the vehicle battery dropping below a threshold first storage level (e.g., 45 percent of fully charged vehicle battery), the vehicle may turn off power to the second port. The threshold storage level may be a variable threshold based on the position of the vehicle and the distance to a charging station. Based on the battery storage level of the vehicle battery dropping below a second threshold storage level (e.g., 15 percent of fully charged vehicle battery), the vehicle may turn off power to the first port.

In some embodiments, the vehicle may include an electronic key fob. In some embodiments, control circuitry associated with the vehicle may include a vehicle control unit configured to control the operation of a platform module of the vehicle and a gateway configured to receive signals from a key fob associated with the vehicle. The electronic key fob may transmit a signal to the gateway of the vehicle indicating a proximity of the electronic key fob to the vehicle. In some embodiments, the control circuitry may turn off power to the plurality of ports in response to a loss of signal from the electronic key fob.

In some embodiments, the control circuitry may operate in a plurality of operational modes. The operational mode may be selected from one of a normal mode and an energy-efficient mode. In an aspect of these embodiments, the energy-efficient mode may be initiated by receiving an input. In response to receiving the input to initiate an energy-efficient mode, the control circuitry may turn off power to the first port of the plurality of ports. In some embodiments, while operating in a normal mode, the vehicle may provide power to one or more ports at a certain voltage level. In some embodiments, while operating in an energy-efficient mode, the vehicle may provide power to one or more ports at a lower voltage level. For example, the vehicle may throttle or reduce the power to one or more ports to reduce the consumption rate and preserve the battery storage level.

In some embodiments, the vehicle may include a user interface. The user interface may receive an input from a push button, a toggle switch, a display screen (e.g., a touch screen), a key fob, a key-lock combination, any other suitable system or component for receiving input from a user or providing output to a user, or any combination thereof. The input may be for turning one or more ports of the plurality of ports off or on.

In some embodiments, the vehicle may further include a usage sensor configured to detect a load on the plurality of ports. In some embodiments, based on no load being detected for a period of time, the control circuitry may turn off power to the plurality of ports. For example, the period of time may be no power being drawn at the ports for 30 minutes, or 45 minutes or another preselected period.

In some embodiments, the platform module further include a plurality of channels configured to provide power. The channels may be configured to provide power via power busses along the channels based on the position of the platform module. For example, channels may provide power to any accessory that is coupled to any one channel or more channels simultaneously. In some embodiments, a first channel of the plurality of channels is configured to provide power when the platform module is in the first position. In some embodiments, a second channel from the plurality of channels is configured to provide power in response to detecting that the platform module is in the second position.

In some embodiments, the present disclosure is directed to a vehicle including a member, a plurality of ports and a switch. In some embodiments, the member is a movable member. The movable member is attached to a rail that is configured to allow the member to move relative to the vehicle. The rail is affixed to a surface of the storage compartment, and the movable member is arranged to be extended from and retracted into the storage compartment. The plurality of ports are disposed on the movable member and configured to provide electric power. In some embodiments, a first port of the plurality of ports provides a first voltage. In some embodiments, a second port of the plurality of ports provides a second voltage. In some embodiments, a switch may turn off power to one of the first, or the second ports in response to the movable member retracting into the storage compartment.

In some embodiments, a method for switching power to a platform module for a vehicle is provided. For example, the control circuitry may provide power to a plurality of ports disposed on a member configured to achieve multiple positions. In some embodiments, the member is a movable member. In some embodiments, the processing circuitry may detecting, based on a position sensor, a position of the member. In some embodiments, based on detecting that the position of the member is in a first position, the control circuitry may provide power to a first port from the plurality of ports disposed on the movable member. In some embodiments, based on detecting that the position of the movable member is in a second position, the control circuitry may provide power to a first port from the plurality of ports disposed on the movable member.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
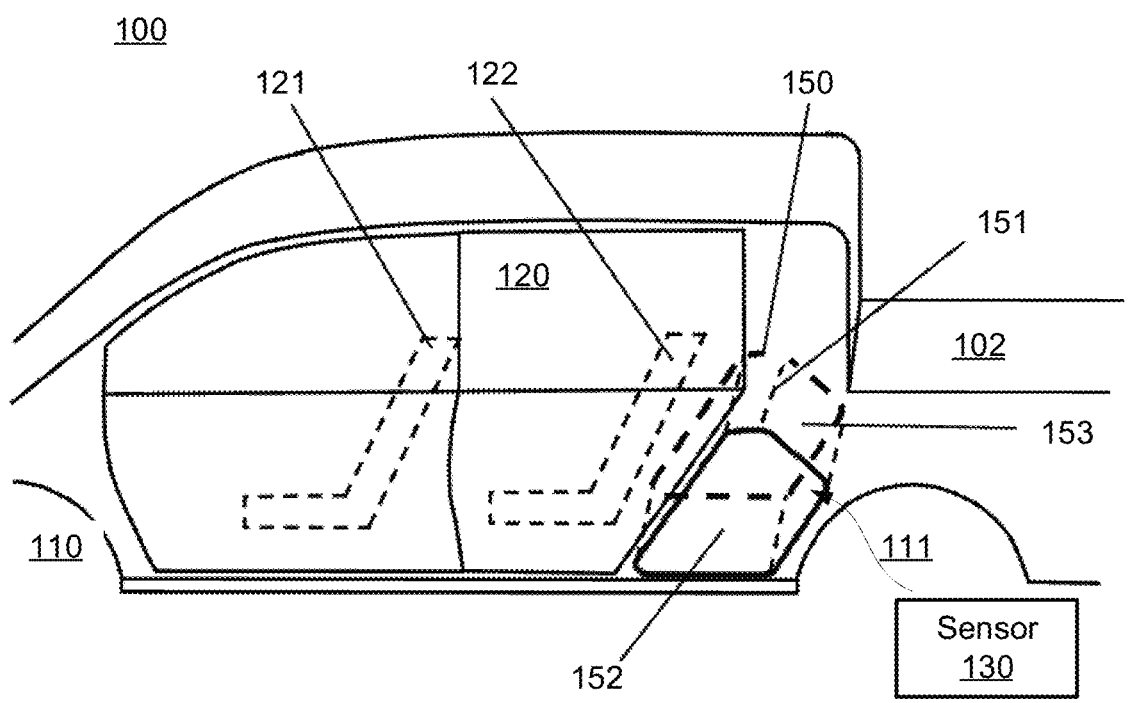
FIG. 1 shows a side view of a portion of an illustrative vehicle having a storage compartment where a platform module is disposed, in accordance with some embodiments of the present disclosure.

FIG. 1 shows a side view of a portion of an illustrative vehicle having a platform module, in accordance with some embodiments of the present disclosure. Vehicle 100 includes storage compartment 150 having a volume and opening 152 to the exterior of vehicle 100. Storage compartment 150 has a profile shape (e.g., as viewed from the side of the vehicle) having sidewalls 153 and corner regions 151 generally corresponding to the shape of the opening at the vehicle exterior (e.g., behind passenger compartment 120 and in front of the rear wheel well 111 and bed 102). As illustrated, storage compartment 150 is arranged behind passenger compartment 120 (e.g., having seats 121 and 122 and a dashboard with vehicle controls). Storage compartment 150 includes opening 152, which provides access to the platform module for a user. For example, the user may open a hatch or door at opening 152, and then pull out the platform module to the side of vehicle 100 to provide access to the platform and the ports on the platform to the user. Storage compartment 150 includes a sensor 130, which indicates the platform module's position. The sensor 130 may be mounted on any of the sidewalls or any other position within the storage compartment 150 and be configured to detect the position of the member. In some embodiments, the member is a movable member. The movable member may be configured to achieve multiple positions, for example, the platform module may be retracted or extended from a storage compartment 150 (e.g., fully or partially). In some embodiments, storage compartment 150 may have a first opening on the left side of the vehicle 100, and a second opening on the right side of the vehicle (e.g., opening 152 is one of the openings, with the other on the opposite side of vehicle 100).

In an illustrative example, a storage compartment (e.g., storage compartment 150) may include one or more sidewalls, which may be a continuous wall that is entirely curved in cross-section, a continuous wall that includes both curved portions and straight portions in cross-section, or a continuous wall with straight and/or curved portions in cross-section with defined edges between sidewalls. For example, the sidewall(s) may be composed of several pieces of panel material assembled together. In a further example, if the sidewall is composed of several pieces, they may be connected together by welding, or with fasteners, or by glue, or by using another means of connecting components. In some embodiments, the sidewalls may be made out of plastic, a metal alloy such as steel sheet or aluminum alloy sheet or the like, composite materials, or other suitable material. In some embodiments, the storage compartment 150 may be shaped in cross-section in a substantially rectangular shape (e.g., a square shape). In some embodiments, the storage compartment 150 is shaped in cross-section in an asymmetric shape (e.g., a polygon shape with no right angles between one sidewall portion and an adjacent sidewall portion and with one sidewall that is longer in cross-section than the rest of the sidewalls). For example, as illustrated, the front sidewall includes a straight portion that is angled towards the back of the vehicle. The rear sidewall includes two straight portions, where the lower straight portion is angled towards the back of the vehicle and the upper straight portion is angled towards the front of the vehicle. In some embodiments, this asymmetric shape increases or maximizes the volume of the storage compartment between the rear seat 122, rear wheel well 111, and the bed of the vehicle. For example, as illustrated, the bottom front portion of the storage compartment extends under the seatback of rear seat 122 and the rearmost portion of the storage compartment extends above a portion of rear wheel well 111.

Figure 2:
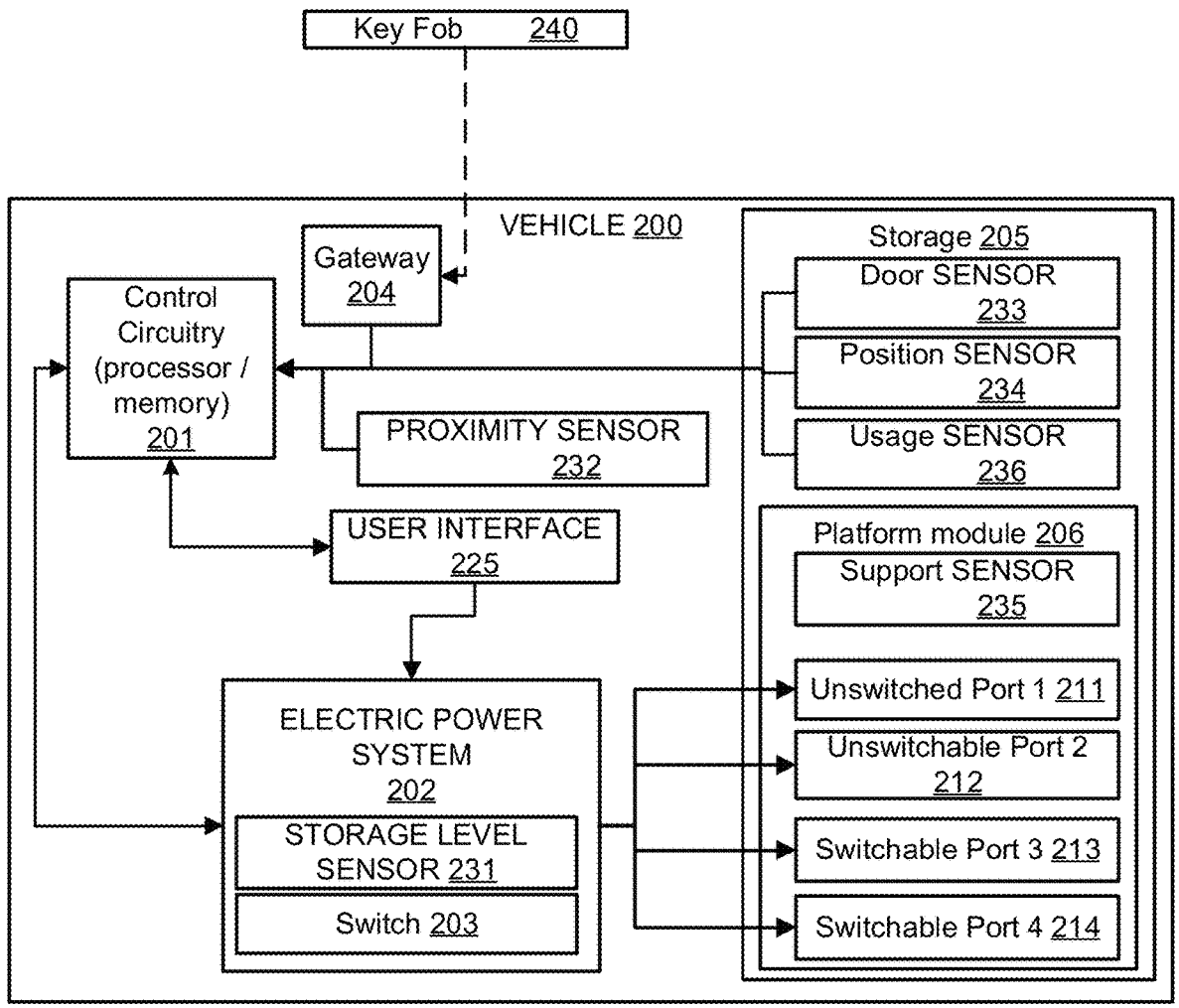
FIG. 2 shows a block diagram of an illustrative vehicle having a platform module with a plurality of ports, in accordance with some embodiments of the present disclosure.

FIG. 2 shows a block diagram of an illustrative vehicle having a platform module for controlling power to ports, in accordance with some embodiments of the present disclosure. Vehicle 200 includes a control circuitry 201, an electric power system 202, a storage compartment 205, a gateway 204, a proximity sensor 232, and a user interface 225. The electric power system 202 may include, for example, a vehicle battery pack that may include a plurality of battery cells. For example, subsets of the battery cells may be coupled in parallel, with the subsets coupled in series with each other to form a DC bus (e.g., to drive one or more electric drive motors, auxiliaries, or other electrical loads). The vehicle may be, but need not be, an electric vehicle. For example, vehicle 200 may include a battery module that provides electrical energy to a motor drive train as well as auxiliary components, any other suitable modules or systems, or a combination thereof. The electric power system 202 includes a battery storage level sensor 231, and a switch 203. The storage compartment 205 includes a door sensor 233, position sensor 234 and the platform module 206. As illustrated in FIG. 2, platform module 206 includes a support sensor 235, a first unswitched port 211, a second unswitched port 212, a third switchable port 213 and a fourth switchable port 214.

As illustrated in FIG. 2, platform module 206 includes unswitched ports 211 and 212 that may provide power continuously. Further, platform module 206 includes switchable ports configured to switch power on and off in response to the position of the platform module in relation to the storage compartment. In some embodiments, the unswitched ports 211 or 212 or both receive power, and the switchable ports 213 and 214 do not receive power. Based on the platform module being extended out of the storage compartment and past a threshold, the power is turned on to switchable ports 213 and 214.

Control circuitry 201 may include hardware, software, or both, implemented on one or more modules configured to provide control of the power provided to ports of the platform module. The control circuitry may be positioned on the platform module 206 or elsewhere (e.g., as part of vehicle circuitry). In some embodiments, control circuitry 201 includes one or more microprocessors, microcontrollers, digital signal processors, programmable logic devices, field-programmable gate arrays (FPGAs), application-specific integrated circuits (ASICs), or any suitable combination thereof. In some embodiments, control circuitry 201 is distributed across more than one processor or processing units. In some embodiments, control circuitry 201 executes instructions stored in memory for managing power to ports in the platform module on vehicle 200. In some embodiments, memory is an electronic storage device that is part of control circuitry 201. For example, memory may be configured to store electronic data, computer instructions, applications, firmware, or any other suitable information. In some embodiments, memory includes random-access memory, read-only memory, hard drives, optical drives, solid-state devices, or any other suitable memory storage devices, or any combination thereof. For example, memory may be used to launch a start-up routine.

In some embodiments, the system may include battery storage level sensor 231, proximity sensor 232, door sensor 233, position sensor 234, support sensor 235 and usage sensor 236. In some embodiments, the control circuitry 201 may be communicatively connected to one or more battery storage level sensors 231 to monitor the battery storage level of the vehicle battery. In some embodiments, based on the battery storage level in the vehicle battery dropping below a threshold storage level, the control circuitry may turn off power to one or more ports on the platform module. For example, if the battery storage level is below 20% of a fully charged vehicle battery. In some embodiments, the control circuitry 201 may be communicatively connected to proximity sensor 232 that provides an electronic indication between the proximity of the user to the vehicle. In some embodiments, based on the proximity of the user to the vehicle battery being greater than a threshold distance, the control circuitry may turn off power to one or more ports on the platform module. For example, if the user is more than 500 feet away from the vehicle. In some embodiments, the electronic indication corresponds to the proximity of a key fob to a proximity sensor of the vehicle. The response to the electronic indication is to turn off power to one or more ports (211-214) on the platform module when the proximity greater than a threshold. In some embodiments, the control circuitry 201 may be communicatively connected to one or more door sensors 233 configured to monitor the opening to the vehicle's storage compartment. In some embodiments, based on the door sensor 233 indicating that the storage compartment is open, the control circuitry may turn on the power to one or more ports (211-214) on the platform module. For example, the power to the switchable ports 213 or 214 may be turned on in response to the door sensor 233 indicating that the door to the storage compartment is open. In some embodiments, the control circuitry 201 may be communicatively connected to position sensor 234 (e.g., encoders for determining platform module position) along the rail system. In some embodiments, two position sensors 234 (e.g., hall effect sensors or mechanical switches) can be used, where one indicates when the platform module is fully retracted and the other indicates when the platform module is fully extended. Based on the position of the platform module 206 being retracted in the storage compartment, the power to the second port 213 or 214 may be turned off. When the position of the platform module 206 is extended along the rail past a threshold position, the control circuitry 201 may provide power to the switchable ports 213 or 214 and the unswitched ports 211 and 212. In some embodiments, platform module 206 may include power electronics to assist with extending and retracting the platform module 206 into the storage compartment 205, and accordingly may be coupled to electric power system 202. In some embodiments, the control circuitry 201 may be communicatively connected to the support sensor 235 (e.g., encoders for determining leg 370 or support) of the platform module 206. Based on the leg 370 or support 371 extending out of the platform module 206, the control circuitry may provide power to the switchable ports 213 or 214 and the unswitched ports 211 and 212. In some embodiments, the control circuitry 201 may be communicatively connected to the usage sensor 236 for determining the consumption of each of the ports 211-214 from the platform module 206.

In some embodiments, the control circuitry 201 includes a vehicle control unit configured to control the operation of power to the ports (211-214) on the platform module 206 of the vehicle 200 and a gateway 204 configured to receive signals from a key fob 240 associated with the vehicle 200. When the gateway 204 fails to receive a signal from the key fob 240, the response is to provide an electronic indication to turn off power to one or more ports (211-214) on the platform module 206. For example, when the key fob 240 is too far away from the gateway 204.

In some embodiments, one or more electrical cables extend from the electric power system 202 (e.g., control switches, fuses, or other electrical components) to turn on the power to the plurality of ports (211-214). In some embodiments, platform module 206 may include electrical components (e.g., with user-adjustable controls) for adjusting the power provided by ports 211-214.

Figure 3:
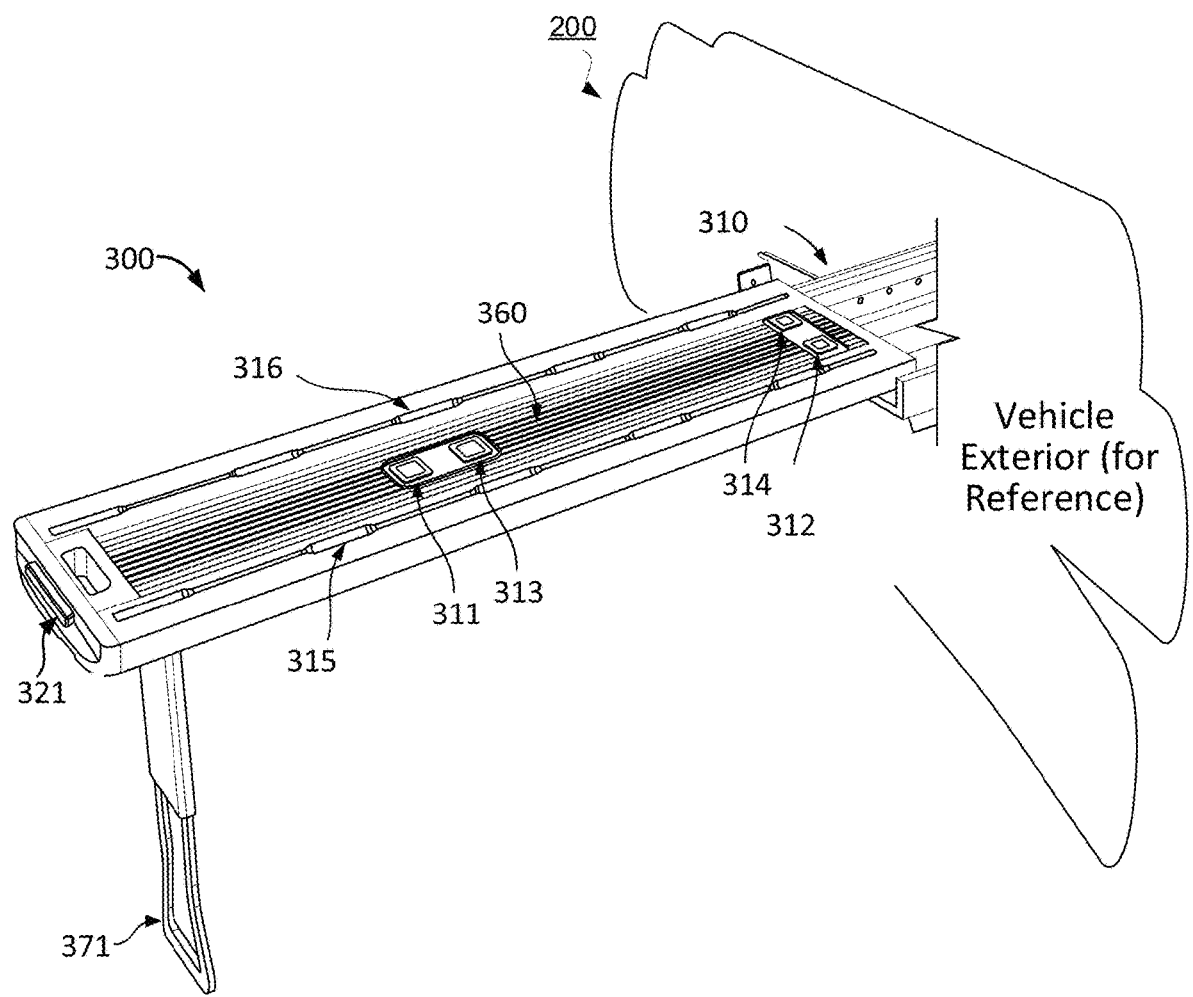
FIG. 3 shows a side perspective view of an illustrative platform module, extended out from a storage compartment of a vehicle, in accordance with some embodiments of the present disclosure.

FIG. 3 shows a side perspective view of an illustrative platform module including a plurality of ports, extended out from a storage compartment of a vehicle, in accordance with some embodiments of the present disclosure. Platform module 300 includes rail system 310 that affixes to the vehicle 200, within the storage compartment, allowing a linear motion of platform module 300. In some embodiments, platform module 300 is an after-market accessory and rail system 310 that can be mounted to hard points in the storage component (e.g., via bolts). In some embodiments, platform module 300 is a factory-installed option. A user may pull out platform module 300 from the storage compartment, through the opening, by applying a force on platform module 300 such that it moves from a first position to a second position. In another example, the user may press a button in the car, or the key fob, or an application on a user equipment, to automatically cause an actuator to retract or extend the platform module 300 such that it moves from a first position to a second position automatically (by the vehicle without any user applying any force). In some embodiments, the platform module 300 slides or rolls along rail system 310. Platform module 300, as illustrated, includes member 360, electric ports 311-316 and release mechanism 321. In some embodiments, the member 360 is a movable member. The release mechanism 321 when depressed, is configured to permit the platform module 300 to be retracted or extended. As illustrated, movable member 360 is an elongated platform with ports disposed along the platform to provide power to accessories and is configured to fit through, for example, the opening 152 of FIG. 1 in the vehicle 200. In some embodiments, platform module 300 may include a leg 370 or a stand configured to support at least some weight of platform module 300 (e.g., when extended). In some embodiments, platform module 300 includes or interfaces to a stationary component that remains in a storage compartment 150. For example, the stationary component may be coupled to an electric power system (e.g., electrical power system 202), to provide functionality to platform module 300. In some embodiments, platform module 300 may include a track system or conduit configured to provide electrical power to ports 311-314 on the platform module 300.

Ports 311-316 may include electrical connectors. For example, in some embodiments, ports 311-316 include electrical terminals configured to provide 12 VDC, 110 VAC, sensor signals, control signals, electrical power or signals at any other suitable voltage or character, or any combination thereof. To illustrate, ports 311-314 may include a plastic terminal face with one or more alignment features to align to corresponding features of a submodule. A platform module may include any suitable number of ports for coupling any suitable systems, arranged in any suitable configuration.

In some embodiments, ports 311-314 need not engage with mating connectors when a submodule is installed. For example, in some embodiments, a submodule may, but need not, cover ports 311-314. In some embodiments, ports described here and throughout the specification include receptacle ports, channel ports, induction ports, or any other ports configured to connect to and transfer power. Channels 315, 316 extend along the length of the platform module 300. The channels are configured to provide power via power busses along the channels. For example, channels 315 and 316 may provide power to any accessory that is coupled to one channel or both channels simultaneously. An accessory may be configured to mate with the channel busses such that power is provided from the platform module 300 to the accessory.

In some embodiments, one or more ports from ports 311-314 may be configured to provide power continuously whether the platform module 300 is extended or retracted into the storage compartment 150. For example, port 314 provides a power of 110 volts continuously to any accessory that is plug into port 314. In some embodiment, a refrigerator may be plugged into port 314, which requires continuous power. In some embodiments, one or more additional ports do not have power when the platform module 300 is retracted into the storage compartment 150. Based on the platform module 300 being extended out of the storage compartment 150, the platform module 300 may be configured to determine the position of the module and turn on the power to the other ports when the platform module 300 is extended out of the storage compartment 150. For example, as the platform module 300 is pulled out of the storage compartment 150, and in response to the platform module 300 extending to a second position, the power to a second port is turned on. In some embodiments, the platform module 300 via the control circuitry 201 may turn on the power to all the ports 311-314 in response to the platform module 300 being extended out of the storage compartment 150. Some of the ports provide a different voltage (e.g., 12 volts, 110 volts). In some embodiments, the platform module 300 via the control circuitry 201 may turn off power to one or more ports 313, 314 in response to the platform module 300 being retracted into the storage compartment 150.

Figure 4:
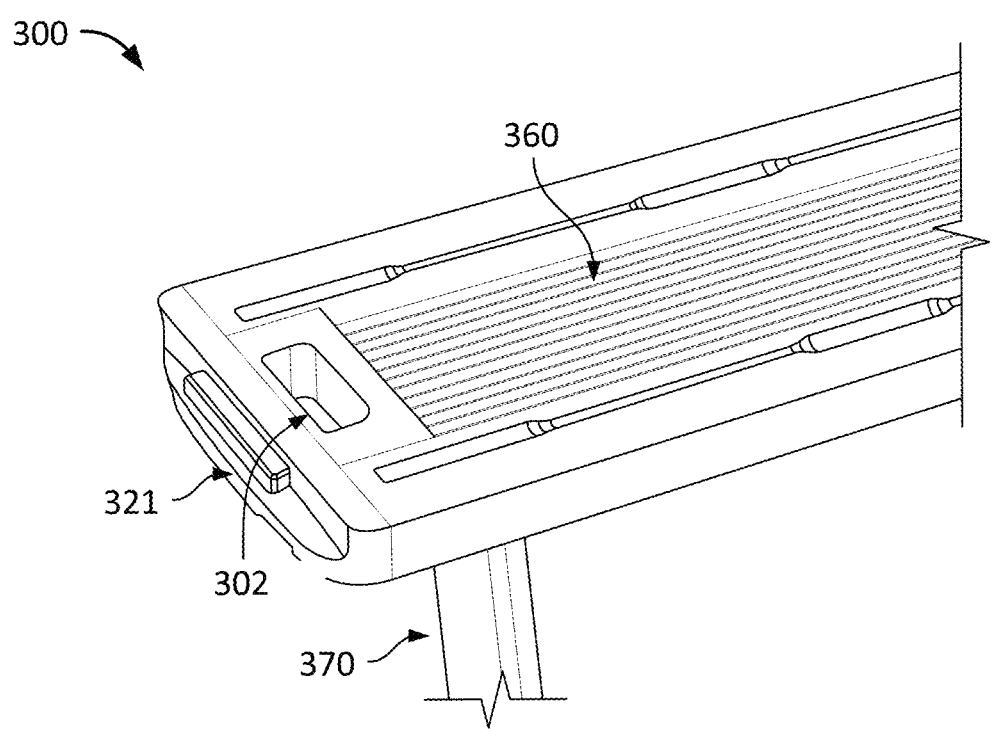
FIG. 4 shows an enlarged perspective view of the illustrative platform module of FIG. 3, in accordance with some embodiments of the present disclosure.

FIG. 4 shows a side perspective view of the outside end of the illustrative platform module of FIG. 3, in accordance with some embodiments of the present disclosure. As illustrated, platform module 300, as shown in FIG. 4, has a distal end of the movable member of the platform module. The platform module 300 includes leg 370 (e.g., telescoping members not shown), movable member 360, handle 302 and release mechanism 321. When release mechanism 321 is depressed, platform module 300 may be retracted or extended from a storage compartment (e.g., fully or partially). In another example, the release mechanism 321 may include a detent when depressed, may also release the leg 370 from the frame in the stored position to an extended position. Leg 370 may be configured to deploy automatically when platform module 300 reaches full extension. For example, when rail system 310 reaches full extension, it may mechanically trigger the release mechanism. This may be accomplished using a boss on the rail system 310 that depresses a detent of the release mechanism in the fully extended position. As another example, when the platform module 300 is in a second position (e.g., fully extended), the control circuitry 201 may trigger the electric power system 202 to provide power to an actuator to extend the leg 370. In some embodiments, the extension of the leg 370 may be adjusted based on the surface along with the vehicle. For example, the platform module 300 may be on an incline and the leg 370 may only require a partial extension of the leg. In another embodiment, based on the surface under the vehicle, the vehicle suspension system may be adjusted to lower or raise the vehicle to allow the platform module 300 to extend and retract from the storage compartment 150. In some embodiments, the leg 370 and the vehicle may be independently adjusted for movable member 360 to have a relatively flat working surface. In yet another embodiment, the vehicle suspension system may be adjusted to the height of the leg 370 on the platform module 300. For example, a preprogram suspension adjustments in response to stopping may be altered based on deployment of the platform module 300.

Figure 5:
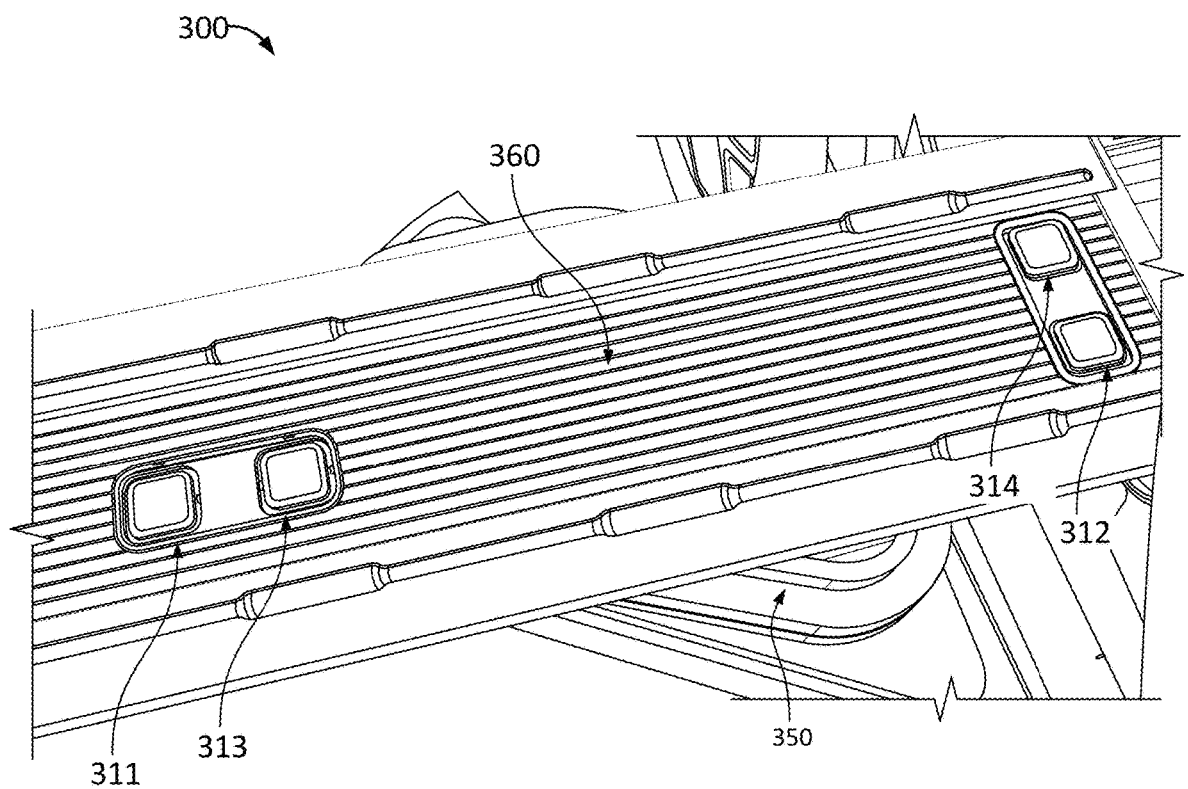
FIG. 5 shows a top perspective view of the illustrative platform module of FIGS. 3-4, in accordance with some embodiments of the present disclosure.

FIG. 5 shows a top perspective view of the illustrative platform module of FIGS. 3-4, in accordance with some embodiments of the present disclosure. FIG. 5 also shows some of the vehicle exterior for reference and indicates door/hatch 350 to the storage compartment, from which platform module 300 may be accessed. Frame system (not shown) is at the bottom of the platform module illustrated in FIG. 5, which forms the structural support for the components of platform module 300. In an illustrative example, four ports 311-314 are disposed on the movable member 360. Any one of the ports may be labeled as the first port, second port, third port and fourth port. In the illustrative example, the first port 311 is disposed on the distal end of the platform and the second port 314 is disposed on the proximal end of the platform. In some embodiments, the first port 312 and the second port 314 are positioned next to each other either on the distal end or the proximal end of the platform. In some embodiments, the switchable ports 213 and 214 from FIG. 2, may be any of the ports 311-314 and the unswitched ports 211 and 212 (i.e., ports that maintain power) may be any of the ports 311-314. For example, the switchable ports may be port 311 and 312. In another embodiment, the switchable ports may be port 311 and 314.

Figure 6:
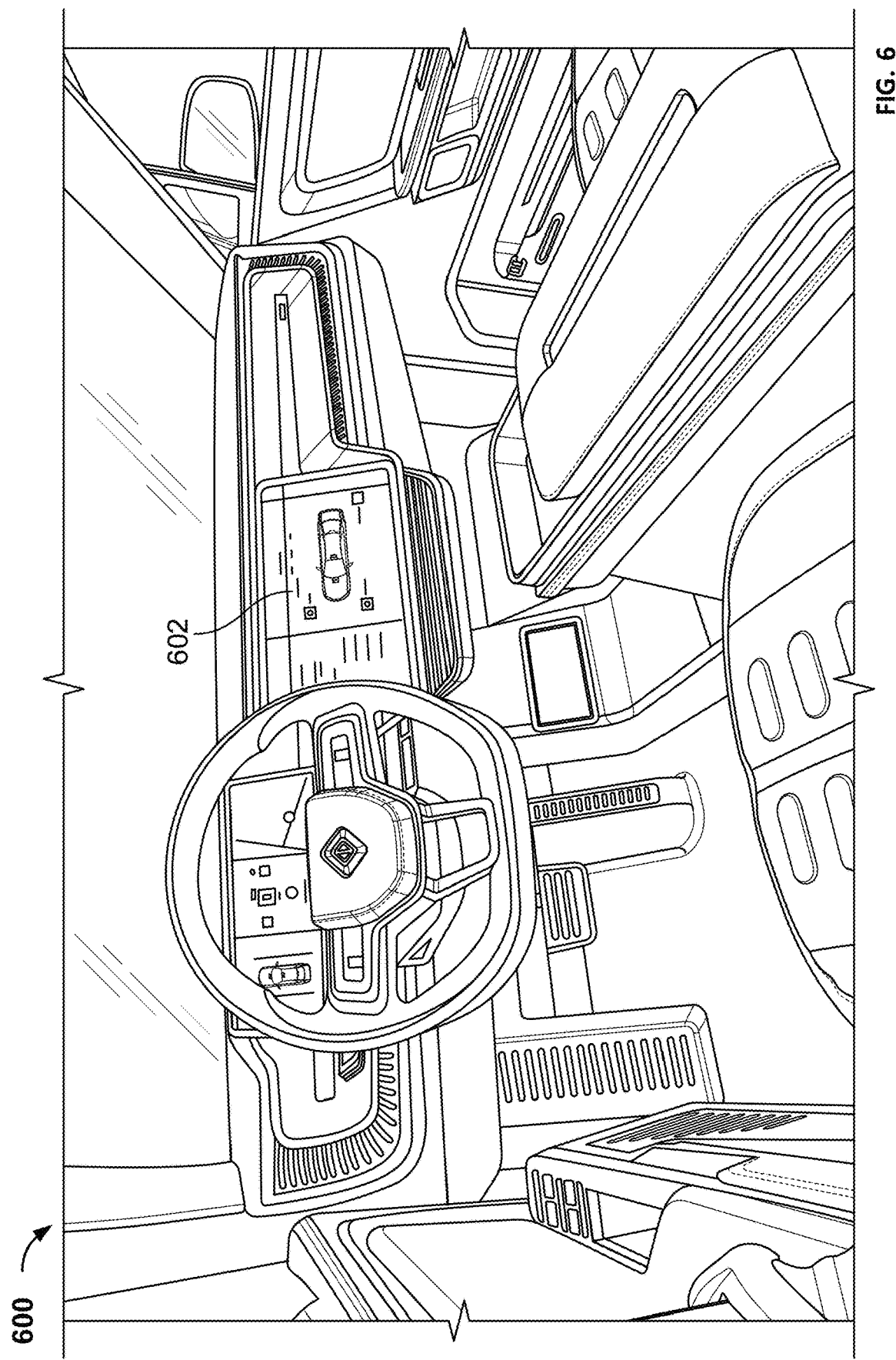
FIG. 6 depicts an illustrative example of an interior of a vehicle featuring a graphical user interface, in accordance with some embodiments of the present disclosure.

FIG. 6 depicts an illustrative example of a vehicle featuring a graphical user interface 602, in accordance with some embodiments of the present disclosure. In some embodiments, a graphical user interface 602 may refer to components incorporated into, coupled to, or accessible by a vehicle such as a vehicle 600 in FIG. 6. The vehicle 600 is equipped with a graphical user interface 602 that may be used to enable/disable vehicle systems including options to enable and disable power to one or more ports on the platform module. For example, a user in vehicle 600 may use the graphical user interface 602 to access options on the vehicle 600. In some embodiments, the graphical user interface 602 may be incorporated into vehicle 600 or user equipment used to access such vehicle system while using vehicle 600. In some embodiments, vehicle systems displayed on the graphical user interface 602 may be communicatively connected with user inputs (e.g., microphone and speakers for providing voice command) of the vehicle 600. In some embodiments, the vehicle systems displayed on the graphical user interface 602 may receive an input to turn on or off any of the ports or channels independently, in groups or all the ports 311-314 and channels 315, 316. For example, the user may provide a voice command to turn off the power to the ports 311-314 and channels 315, 316 on the platform module 300 of FIG. 3 and the audio system incorporated into vehicle 600 may convert such a command to turn off the power to the ports 311-314 and channels 315, 316 on the platform module 300.

Figure 7:
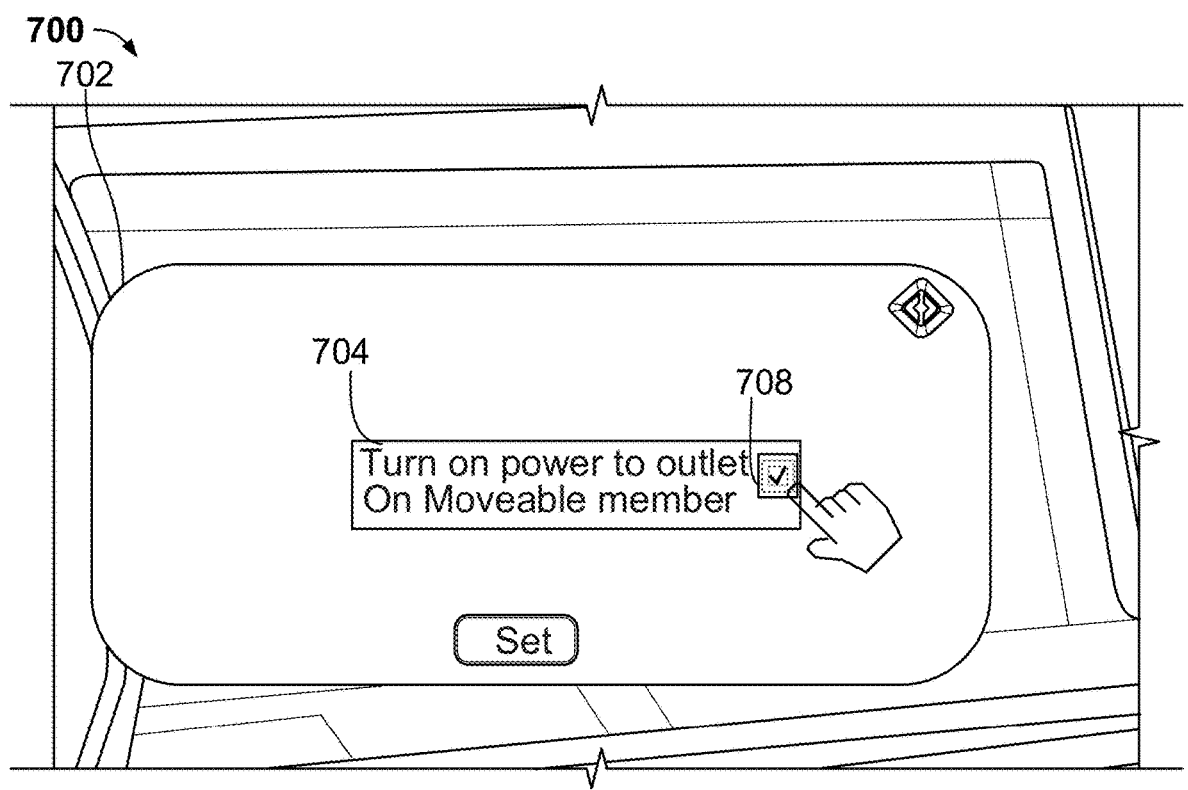
FIG. 7 depicts an example of a graphical user interface for controlling power to the ports on the platform module of FIGS. 3-4, in accordance with some embodiments of the present disclosure.

FIG. 7 depicts an example of a graphical user interface 602 for controlling the power on the platform module 300 of FIGS. 3-4, in accordance with some embodiments of the present disclosure. As discussed above, in some embodiments, a user or occupant of the vehicle 600 may control the power to the platform module 300 incorporated into or accompanying the graphical user interface 602 by direct input into the user interface (e.g., activating the platform system via user interface 700 FIG. 7). Upon a user's selection of the user interface 700 (e.g., selection of a platform module 300), an platform module option 704 appears on display 702 for platform module 300 on the user interface 700, as shown in illustrative example in FIG. 7. The platform module option 704 is a selectable option that the user can enter to turn on or turn off the power to the platform module 300. When the user or occupant of the vehicle accesses the platform module 300 interface via the user interface (e.g., user interface 700 (FIG. 7)) incorporated into or accompanying the graphical user interface 700, the user may control the power using the check mark option 708.

Figure 8:
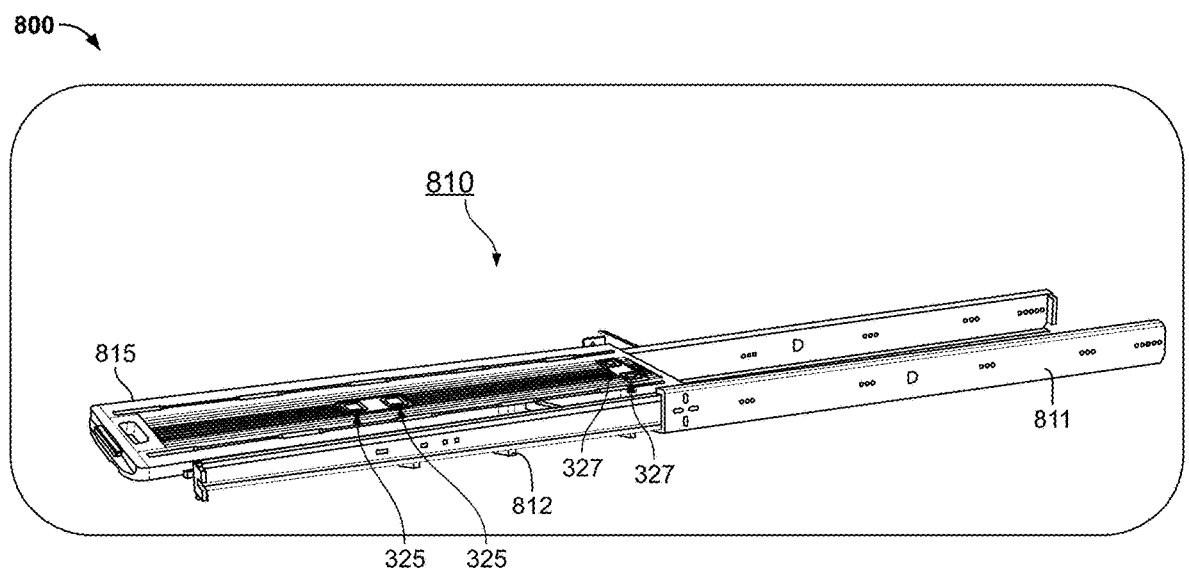
FIG. 8 shows a top perspective view of the illustrative platform module of FIG. 3 with the rail system extended, in accordance with some embodiments of the present disclosure.

FIG. 8 shows a top perspective view of the illustrative platform module 300 for controlling power to ports of FIG. 3 with the rail system extended, in accordance with some embodiments of the present disclosure. As illustrated in FIG. 8, rail members 812 of rail system 810 are configured to slide relative to rail members 811 (e.g., which are affixed to the vehicle) and are affixed to frame system 815 of platform module 800 (e.g., illustrated as extended). A rail system may include any suitable rail type, and may include wheel bearings, slide bushings, telescoping components, any other suitable components for allowing linear motion of a platform module, or any combination thereof. In some embodiments, the rail system 810 is connected to an electrical extension of the vehicle and is configured to provide an electric power source of the vehicle to the platform module 800. Further, the configuration of the ports and channels is meant to be exemplary and not limiting, and the ports may be positioned in any other locations.

Figure 9:
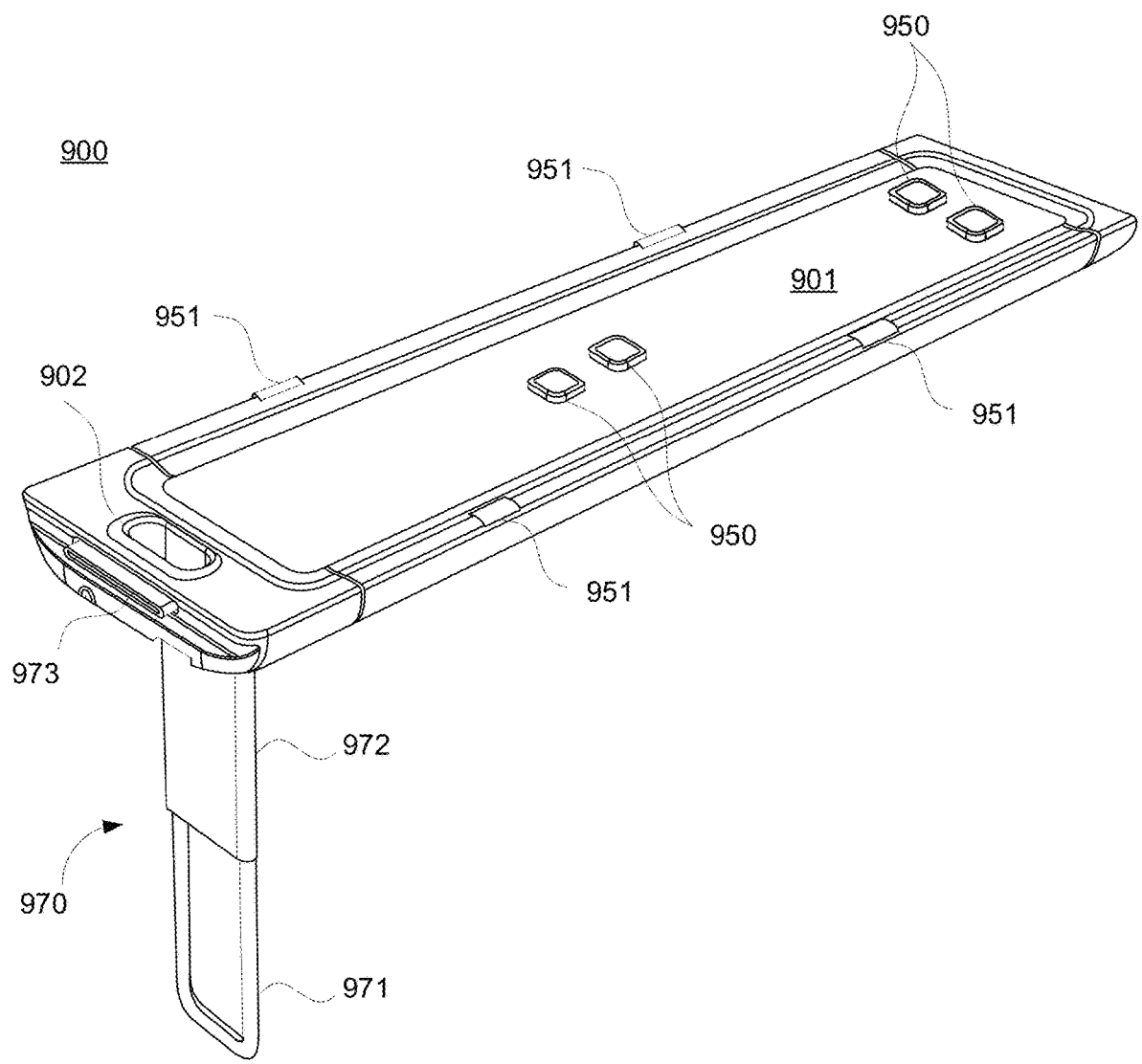
FIG. 9 shows a side perspective view of an illustrative platform module with a different configuration of the ports, in accordance with some embodiments of the present disclosure.

FIG. 9 shows a top perspective view of the outside end of the illustrative platform module 300 system of FIG. 3, in accordance with some embodiments of the present disclosure. As illustrated, platform module 900 includes leg 970 (e.g., telescoping members 971 and 972), movable member 901, latches 951, connectors 950, handle 902, and release mechanism 973. Members 971 and 972 of leg 970 are configured to extend and retract relative to each other, and may include one or more position detents. Leg 970 may include a support sensor 235 to track if the leg is folded up or in the extended position. Leg 970 is configured to fold up to the underside of movable member 901 when release mechanism 973 is pulled. In some embodiments, release mechanism 973 may include a ratchet or other detent to define one or more positions. When release mechanism 973 is depressed, platform module 900 may be retracted or extended from a storage compartment 150 (e.g., fully or partially). A user may apply force to handle 902 to pull or push shuttle system 900 (e.g., for extending or retracting). In an illustrative example, any of the illustrative platform modules of the present disclosure may include one or more handles. In some embodiments, movable member 901 slides along grooves of a storage compartment 150 to allow extension and retraction. In some embodiments, movable member 901 includes a rail system that allows movable member 901 to be extended and retracted from a storage compartment 150. In some embodiments, a rail system may include one or more stationary components connected to the vehicle (e.g., bolted into the storage compartment 150). In some embodiments, platform module 900 includes or interfaces to a stationary component that remains in a storage compartment 150. For example, the stationary component may be coupled to an electrical system, to provide functionality to platform module 900. In some embodiments, platform module 900 may include a track system or conduit configured to provide electrical power to ports on the platform module.

Ports 950 may include electrical connectors. For example, in some embodiments, ports 950 include electrical terminals configured to provide or receive 12 VDC, 110 VAC, sensor signals, control signals, electrical power or signals at any other suitable voltage or character, or any combination thereof. To illustrate, ports 950 may include a plastic with one or more alignment features to align to corresponding features of a submodule. To further illustrate, a submodule may include a mating connector that mates to one or more of ports 950 to couple an electrical system. A platform module may include any suitable number of ports, for coupling any suitable systems, arranged in any suitable configuration. In some embodiments, ports 950 need not engage with mating connectors when a submodule is installed. For example, in some embodiments, a submodule may, but need not, cover ports 950. In a further example, a user may engage a mating connector to one or more of ports 950 (e.g., a submodule may allow access to ports 950 when installed).

In an illustrative example, a rail system may be manually operated, automatically operated, or a combination thereof. For example, in some embodiments, a user may push and pull a portion of the rail system to retract or extend the platform module system. In a further example, a user may push a button or otherwise provide an indication (e.g., on a key fob or touchscreen) to cause an actuator to retract or extend the rail system of the platform module system.

In an illustrative example, in some embodiments, a storage compartment 150 may include an opening on each side of the vehicle, and accordingly, a platform module 900 (or rail system thereof) may be extended from either side of the vehicle (e.g., the storage compartment 150 may include two covers, and be a through recess in the vehicle. For example, a platform module system (e.g., including a two-way travel rail system) may include a release mechanism 973 and handle 902 on each side such that it may be pulled and retracted from either side.

Figure 10:
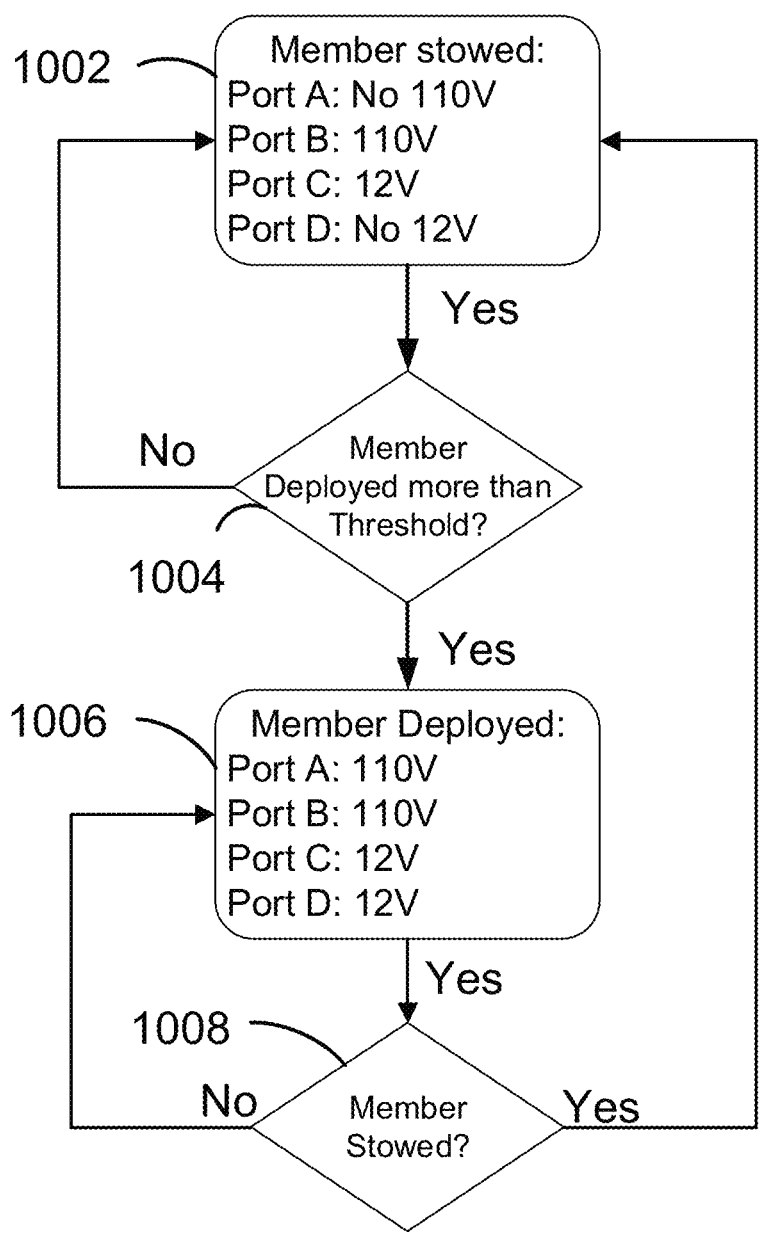
FIG. 10 shows a flowchart for an exemplary process for controlling power to the platform module, in accordance with some embodiments of the present disclosure.

FIG. 10 shows a flowchart for an exemplary process 1000 for controlling power to the platform module 206, in accordance with some embodiments of the present disclosure. In some embodiments, process 1000 may be executed by control circuitry 201 of vehicle 100 (FIG. 1). It should be noted that process 1000 or any step thereof could be performed on, or provided by, the system of FIG. 2. In addition, one or more steps of process 1000 may be incorporated into or combined with one or more other steps described herein.

Process 1000 begins at 1002, where the control circuitry 201 may determine whether the platform module is stowed in the storage compartment. For example, the control circuitry 201 may determine that the platform module is stowed after the position sensor 234 transmits a signal of the platform position in the storage compartment. At 1004, the control circuitry 201 may determine whether one or more criteria to confirm the platform module is stowed are met. For example, referring back to FIG. 3, whether a door to the storage compartment is closed and the position of the platform module along the rail. In some embodiments, the control circuitry 201 may use a door sensor 233 connected to a door to determine that the door is closed. In some embodiments, the control circuitry 201 may use a position sensor 234 connected to a rail system to determine that the platform module is in the storage compartment 205. Based on the platform module 206 being stowed in the storage compartment 205, the control circuitry 201 may provide power to a first port (e.g., port B: 110V or port C: 12V). In some embodiments, the control circuitry 201 may provide power to one or more ports on the platform module 206, and turn off power to one or more second ports (e.g., ports A and ports D). That is, when the platform module is stowed, some ports receive power and some ports do not receive power. On the other hand, when the platform is deployed, the process proceeds to 1006.

At 1006, the control circuitry 201 may determine whether the platform module is deployed out of the storage compartment. For example, the control circuitry 201 may determine that the platform module is slid on the rail system outside of the storage compartment after the position sensor 234 transmits signal of the platform position to the control circuitry 201. At 1008, the control circuitry 201 may determine whether one or more criteria to confirm the platform module is deployed are met. For example, referring back to FIG. 3, whether a door to the storage compartment is open, whether the leg/support 370 is folded up or in the extended position and where the position of the platform module is along the rail system. In some embodiments, the control circuitry 201 may use a door sensor 233 connected to a door to first determine that the door is open and proceed to the position sensor 234. In some embodiments, the control circuitry 201 may use a position sensor 234 connected to a platform member to determine that the position of the member has extended past the threshold position. In some embodiments, the control circuitry 201 may use a support sensor 235 connected to a leg 370 to determine that the leg is extended out to support the platform module. Based on the platform module being deployed out of the storage compartment, the control circuitry 201 may provide power to a first port (e.g., port B: 110V or port C: 12V) and the second port (e.g., ports A and ports D). That is, when the platform module is deployed, the first port and the second port receive power from the electric power system 202. When the platform is determined to be stowed, the process reverts to 1002.

Figure 11A:
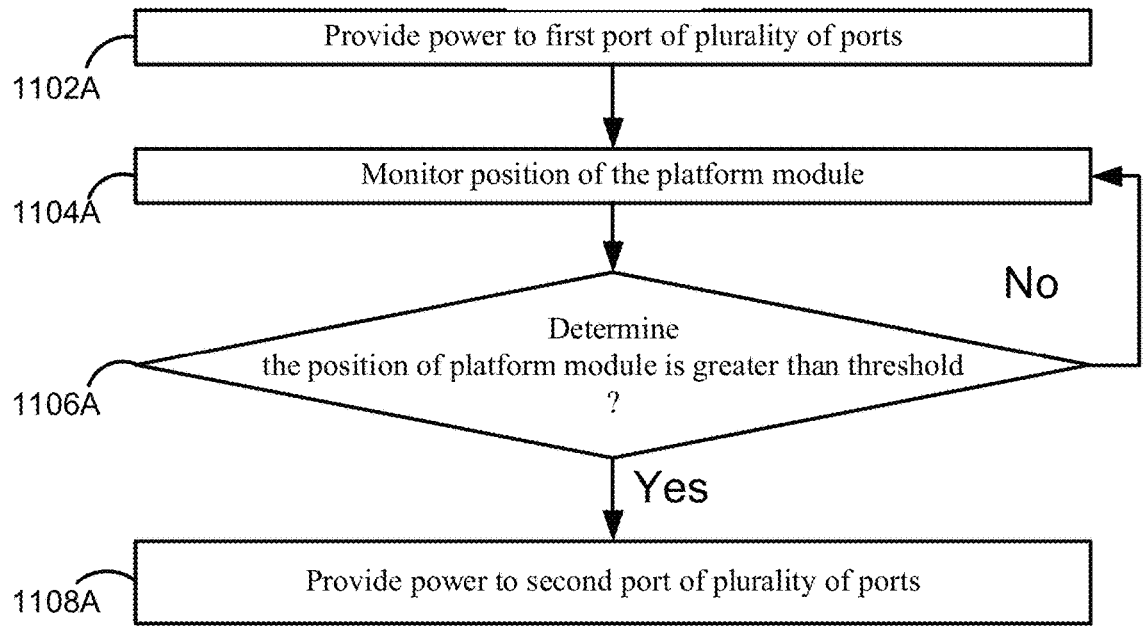
FIGS. 11A and 11B show flowcharts for other exemplary processes for controlling power to the platform module, in accordance with some embodiments of the present disclosure.

FIGS. 11A and B show flowcharts for other exemplary processes 1100A and 1100B for controlling power to the platform module, in accordance with some embodiments of the present disclosure. In some embodiments, process 1100A of FIG. 11A may be executed by control circuitry 201 of vehicle 100 (FIG. 1). It should be noted that process 1100A or any step thereof could be performed on, or provided by, the system of FIG. 2. In addition, one or more steps of process 1100A may be incorporated into or combined with one or more other steps described herein.

The process 1100A begins at 1102A, the control circuitry 201 may provide power to the first port of a plurality of ports. For example, the control circuitry 201 may trigger the electric power system 202 to provide power to unswitched port 211 from FIG. 2. Further, the control circuitry 201 may trigger the electric power system 202 to provide power to unswitched port 212. In some embodiments, step 1102A is performed in response to a user pressing an option on a graphical user interface 702 from FIG. 7. Yet, in some embodiments, step 1102A may be performed continuously to provide power to accessories that require it. Generally, the power is provided until one or more sensors 231-235 in the vehicle 200 disengages power to the plurality of ports on the platform module.

In some embodiments, at 1104A, the control circuitry 201 may monitor the position of the platform module. In some embodiments, the position of the platform module is determined by the vehicle position sensor 234. The vehicle's position sensor 234 provides data indicative of the position of the platform module, for example, the platform may be retracted or extended from a storage compartment (e.g., fully or partially). In some embodiments, the control circuitry 201 may be communicatively connected to one or more position sensor 234 that provide data indicative of the position of the platform module 206 in 3D space. For example, position sensor 234 of FIG. 2 may provide data indicative of a partially extended platform module 206, and a fully extended platform module 206.

In some embodiments, the process 1100A continues at 1106A, where the control circuitry 201 may determine whether the position of the platform module 206 is extended greater than the a threshold. In some embodiments, the where the position sensor 234 indicates that the position of the platform module has moved from the stowed position. In some embodiments, where a single sensor 234 is used to indicate when platform module 206 is fully retracted, the control circuitry 201 determines that the platform module 206 has exceeded the threshold when sensor 234 indicates that the platform module 206 is not fully retracted. In some embodiments, where an encoder sensor 234 is used to indicate the position of platform module 206, the control circuitry 201 determines that the platform module 206 has exceeded the threshold when the platform module is at least 50, 60, 70, 80, 90, or 100 percent extended. In some embodiments, at 1106A, the control circuitry 201 performs one or more criteria checks as part of determining whether the position of the platform module exceeds a threshold. For example, control circuitry 201 may check whether door sensor 233 indicates that the door, through which the platform module extends, is open and whether support sensor 234 indicates that the leg is extended from the platform module. In response to determining by the control circuitry 201 that the position has exceeded the threshold, process 1106A continues at 1108A o provide power to a second port of the plurality of ports. For example, the control circuitry 201 may trigger the electric power system 202 to provide power to switchable port 213 from FIG. 2. Further, the control circuitry 201 may trigger the electric power system 202 to provide power to switchable port 214.

Figure 11B:
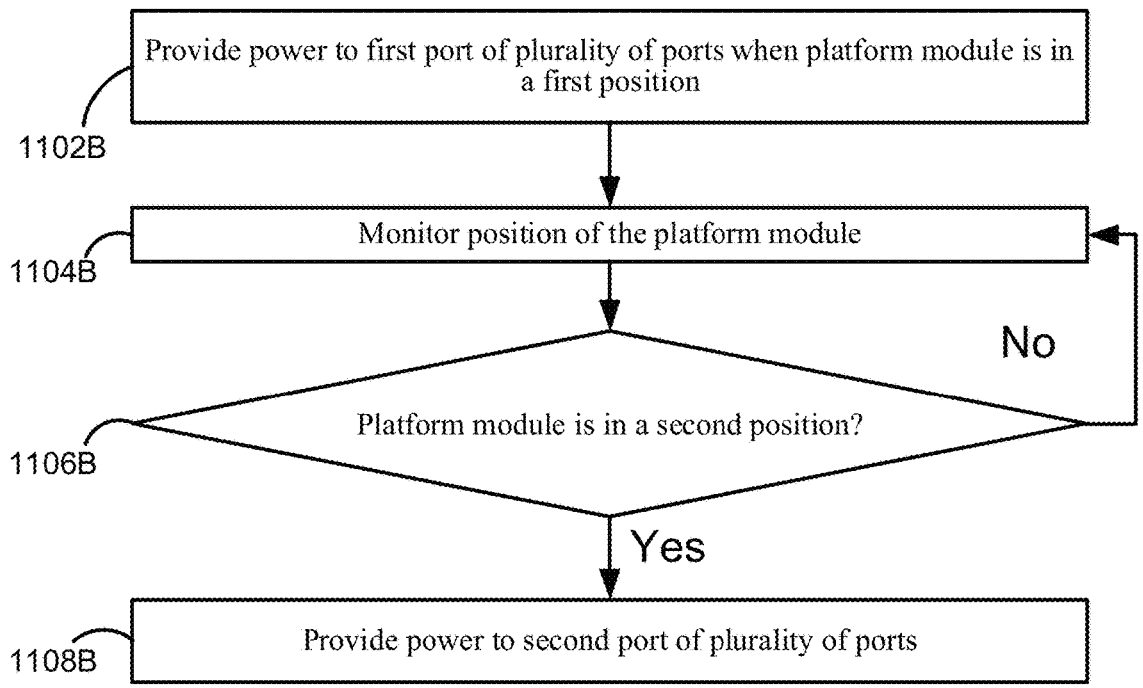

FIG. 11B show a flowchart for another exemplary process 1100B for controlling power to the platform module, in accordance with some embodiments of the present disclosure. In some embodiments, process 1100B may be executed by control circuitry 201 of vehicle 100 (FIG. 1). It should be noted that process 1100B or any step thereof could be performed on, or provided by, the system of FIG. 2. In addition, one or more steps of process 1100B may be incorporated into or combined with one or more other steps described herein.

The process 1100B begins at 1102B, the control circuitry 201 may provide power to the first port of a plurality of ports when the platform module is in a first position. For example, the control circuitry 201 may trigger the electric power system 202 to provide power to unswitched port 211 from FIG. 2. Further, the control circuitry 201 may trigger the electric power system 202 to provide power to unswitched port 212. In some embodiments, step 1102B is performed in response to a user pressing an option on a graphical user interface 702 from FIG. 7. Yet, in some embodiments, step 1102B may be performed continuously to provide power to accessories that require it. Generally, the power is provided until one or more sensors 231-235 in the vehicle 200 disengages power to the plurality of ports on the platform module.

In some embodiments, at 1104B, the control circuitry 201 may monitor the position of the platform module along the rail system. In some embodiments, the position of the platform module is determined by the vehicle position sensor 234. The vehicle's position sensor 234 provides data indicative of the position of the platform module, for example, the platform may be retracted or extended from a storage compartment (e.g., fully or partially). In some embodiments, the control circuitry 201 may be communicatively connected to one or more position sensor 234 that provide data indicative of the position of the platform module 206 in 3D space. For example, position sensor 234 of FIG. 2 may provide data indicative of a partially extended platform module 206, and a fully extended platform module 206.

In some embodiments, the process 1100B continues at 1106B, where the control circuitry 201 may determine whether the platform module 206 is in a second position. In some embodiments, the where the position sensor 234 indicates that the position of the platform module is in a first position or a second position. In some embodiments, where a single sensor 234 is used to indicate when platform module 206 is fully retracted, the control circuitry 201 determines that the platform module 206 has exceeded the threshold when sensor 234 indicates that the platform module 206 is not fully retracted. In some embodiments, in response to determining by the control circuitry 201 that the position has achieved a second position, process 1106B continues at 1108B to provide power to a second port of the plurality of ports. For example, the control circuitry 201 may trigger the electric power system 202 to provide power to switchable port 213 from FIG. 2. Further, the control circuitry 201 may trigger the electric power system 202 to provide power to switchable port 214.

Figure 12:
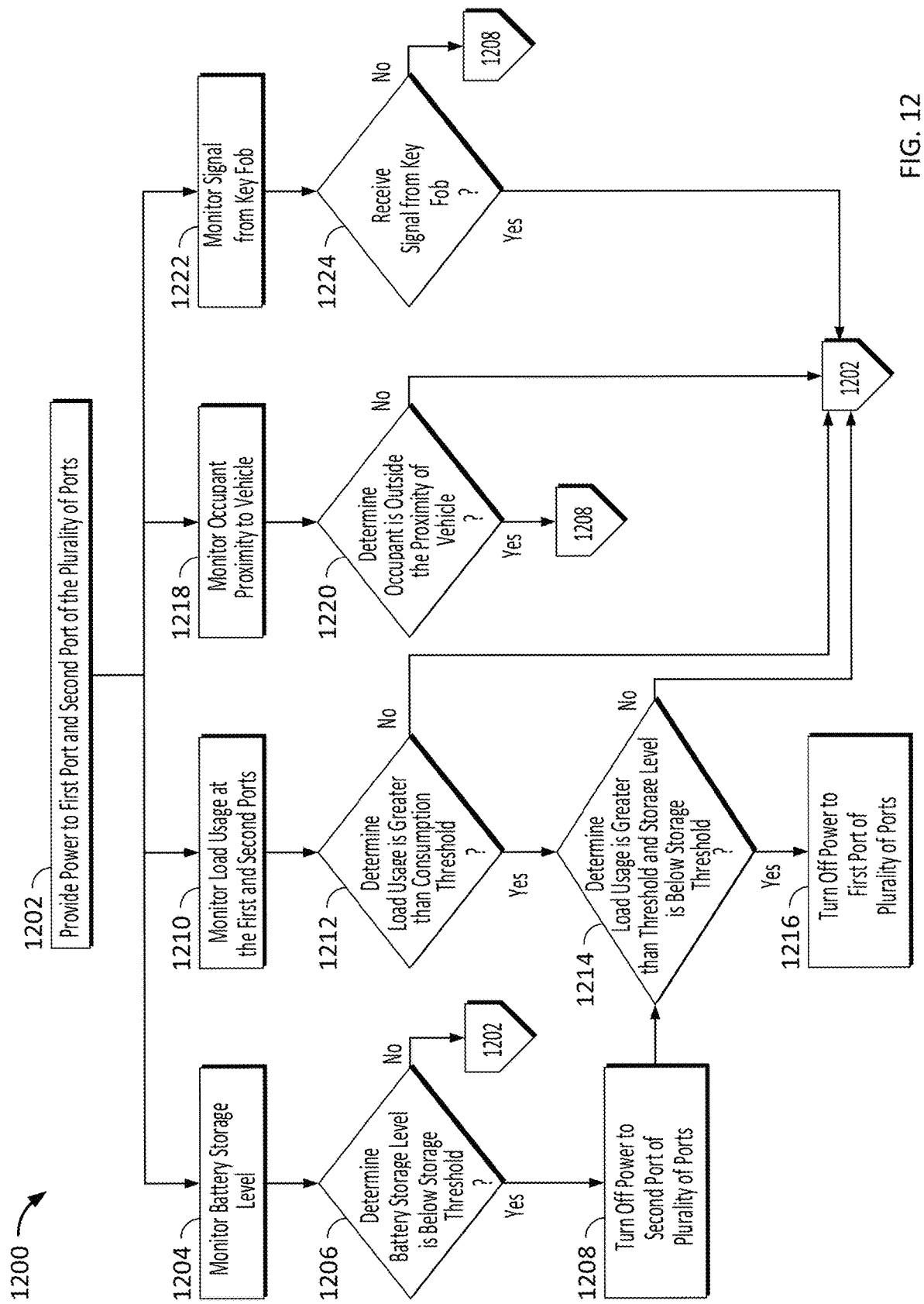
FIG. 12 shows a flowchart for an exemplary process for controlling power to the platform module based on input from various sensors, in accordance with some embodiments of the present disclosure.

FIG. 12 shows a flowchart for an exemplary process 1200 for controlling power to the platform module 206 based on sensor input, in accordance with some embodiments of the present disclosure. In some embodiments, process 1200 may be executed by control circuitry 201 of vehicle 100 (FIG. 1). It should be noted that process 1200 or any step thereof could be performed on, or provided by, the system of FIG. 2. In addition, one or more steps of process 1200 may be incorporated into or combined with one or more other steps described herein. Further, it should be noted that in some embodiments process 1200 is a continuation of process 1100 and proceeds from step 1108, where the control circuitry 201 provides power to the first port 211 and the second port 213.

The process 1200 begins at 1202, where the control circuitry 201 may provide power to the first port 211 and the second port 212 of a plurality of ports on the platform module of the vehicle. In some embodiments, the control circuitry 201 may provide power to the ports while the platform module is stowed or deployed. In some embodiments, the control circuitry 201 may provide power to trigger the electric power system 202 to provide power to unswitched port 211 and switchable port 213 from FIG. 2. In some embodiments, step 1202 is performed in response to a user pressing an option on a graphical user interface 702 of the vehicle 200 to turn on the power to the ports on the platform module. Generally, the power is provided until one or more sensors 231-235 in the vehicle 200 disengages power to the plurality of ports on the platform module. Each of steps 1206, 1210, 1218 and 1222 may be performed simultaneously or in series.

The process 1200 continues at 1204, where the control circuitry 201 may monitor the battery storage level. For example, the control circuitry 201 may receive a signal from the battery storage level sensor 231 indicative of the battery level for the vehicle. Next, at 1206, the control circuitry 201 may determine if the battery storage level is below a threshold storage level. For example, if the battery storage level is below 20% of a fully charged battery. If the control circuitry 201 determines that the battery storage level is below the storage threshold ("Yes" at 1206), then at 1208, control circuitry 201 turns off power to the second port of the plurality of ports. If, on the other hand, the control circuitry 201 determines that the battery storage level is above the storage threshold ("No" at 1206), then step 1202 is repeated.

Process 1200 continues at 1210, where the control circuitry 201 may monitor the load usage of the first and second ports. For example, the control circuitry 201 may receive a signal from the usage sensor 236 indicative of the consumption for the ports 211-214 of the vehicle 200. In some embodiments, the usage sensor may be configured to detect consumption for the ports 211-214 of the vehicle 200. Next, at 1212, the control circuitry 201 may determine if the load usage is greater than a threshold consumption rate. For example, if all the ports are providing power to accessories, then 100% of capacity is being utilized. As another example, if all the ports are providing maximum power output to accessories, then 100% of capacity is being utilized. The threshold consumption rate may be a value determined based on the vehicle's distance to a charging station and may be changed gradually. If, the control circuitry 201 determines that the load usage is less than the threshold consumption rate ("No" at 1212), then step 1202 is repeated. If, on the other hand, the control circuitry 201 determines that the load usage is greater than the consumption threshold ("Yes" at 1212), then at 1214, the control circuitry 201 may determine if the load usage is greater than a threshold consumption rate and the battery storage level is below the threshold storage level. For example, the battery level is below 20% and usage from the ports is 50% of capacity. Then at 1216, control circuitry 201 turns off power to the first port of the plurality of ports. If, on the other hand, the control circuitry 201 determines that the load usage is less than a threshold consumption rate or the battery storage level is greater than the threshold storage level ("No" at 1214), then step 1202 is repeated.

The process 1200 continues at 1218, where the control circuitry 201 may monitor occupant proximity to the vehicle. For example, the control circuitry 201 may receive a signal from the proximity sensor 232 indicative of the occupant's location to the vehicle. In some embodiments, the proximity sensor 232 may track a distance between a user and the vehicle. In some embodiments, the occupant's device (e.g., mobile phone) may be used to track the occupant's proximity to the vehicle. Next, at 1220, the control circuitry 201 may determine if the occupant is outside of the proximity of the vehicle. For example, if the user is 500 feet away from the vehicle. If the control circuitry 201 determines that the occupant is outside of the proximity of the vehicle ("Yes" at 1220), then at 1208, control circuitry 201 turns off power to the second port of the plurality of ports. If, on the other hand, the control circuitry 201 determines that the occupant is inside of the proximity of the vehicle ("No" at 1220), then step 1202 is repeated.

Process 1200 continues at 1222, the control circuitry 201 may monitor for a signal from a key fob 240. For example, the control circuitry 201 via a gateway 204 communicating with a key fob 240 may receive a signal from the key fob 240 indicative of the key fob's 240 proximity to vehicle 200. Next, at 1224, the control circuitry 201 may receive a signal from the key fob 240. If the control circuitry 201 receives signals from the key fob 240 ("Yes" at 1224), then step 1202 is repeated. If, on the other hand, the control circuitry 201 does not receive signals from the key fob 240 ("No" at 1224), then at 1208, control circuitry 201 turns off power to the second port of the plurality of ports.

It will be understood that process 1200 is merely illustrative and various modifications can be made within the scope of the disclosure. For example, in some embodiments, steps 1204, 1210, 1218 and 1222 can be omitted and step 1202 can be performed in response to the user input via a user interface 225 to, at step 1202, provide power to the first port and the second port. It should also be noted that processes 1000-1200 may be combined sequentially, specific steps from each of the processes 1000-1200 may be combined to establish a separate process, among other possibilities.

It is contemplated that the system, steps or descriptions of each of FIGS. 1-12 may be used with any other embodiment or embodiments of this disclosure. One skilled in the art would appreciate that some system components, steps or descriptions of each of FIGS. 1-12 may be optional and may be omitted in some embodiments. More generally, the disclosure is meant to be exemplary and not limiting. In addition, the steps and descriptions described in relation to FIGS. 1, and 3-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-9 could be used to perform one or more of the steps in FIGS. 10-12.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A platform module having switchable power for a vehicle, the platform module comprising:
   a movable member comprising a plurality of ports configured to provide power; and
   a position sensor configured to detect a position of the movable member, wherein:
      a first port from the plurality of ports is configured to provide the power when the movable member is in a first position; and
      a second port from the plurality of ports is configured to provide the power in response to detecting that the movable member is in a second position without providing power when the movable member is in the first position.

2. The platform module of claim 1, wherein the first port and the second port are configured to output different voltages.

3. The platform module of claim 1, wherein the vehicle comprises:
   a vehicle battery configured to provide the power to the first port and/or the second port;
   a sensor configured to monitor a battery storage level of the vehicle battery; and
   control circuitry configured to turn off the power to the second port based on the battery storage level dropping below a threshold storage level.

4. The platform module of claim 3, wherein the vehicle further comprises:
   a load usage sensor configured to monitor a power consumption of the plurality of ports; and
   control circuitry configured to turn off the power to the first port based on the power consumption rate being greater than a threshold consumption rate and the battery storage level being less than the threshold storage level.

5. The platform module of claim 1, wherein the vehicle further comprises:
   a proximity sensor configured to track a distance between a user and the vehicle; and
   control circuitry configured to turn off power to the second port of the plurality of ports in response to the proximity sensor identifying that the distance is greater than a threshold distance.

6. The platform module of claim 1, wherein the vehicle further comprises:
   control circuitry configured to:
      monitor a battery storage level at a vehicle battery;
      turn off the power to the first port based on the battery storage level falling below a first threshold storage level; and
      turn off power to the second port based on the battery storage level falling below a second threshold storage level.

7. The platform module of claim 1, wherein the vehicle further comprises:
   an electronic key fob configured to transmit a signal to the vehicle indicating a proximity of the electronic key fob to the vehicle; and
   control circuitry configured to turn off the power to the second port in response to a loss of signal from the electronic key fob.

8. The platform module of claim 1, wherein the vehicle further comprises:
   control circuitry configured to:
      operate in a plurality of operational modes, wherein at least one of a normal mode and an energy-efficient mode is selected from the plurality of operational modes;
      initiate the energy-efficient mode; and
      turn off power to the first port of the plurality of ports in response to initiating the energy-efficient mode.

9. The platform module of claim 8, wherein the vehicle further comprises:
   a user interface configured to receive an input, wherein the input is one of turning one or more ports of the plurality of ports off or on.

10. The platform module of claim 1, wherein the vehicle further comprises:
    a usage sensor configured to detect a load on the plurality of ports; and control circuitry configured to turn off the power to the plurality of ports in response to the load being undetected for a period of time.

11. The platform module of claim 1, wherein each port of the plurality of ports is coupled by an electric wire system to a vehicle battery.

12. The platform module of claim 1, wherein the movable member comprises:
a frame;
a countertop positioned on top of the frame;
the plurality of ports disposed on the countertop; and
a leg member configured to pivot around an end of the frame and provide support to at least some of the platform module.

13. A vehicle comprising:
a movable member configured to extend from a storage compartment;
a plurality of ports disposed on the movable member and configured to provide electric power, wherein:
a first port of the plurality of ports disposed on the movable member is configured to provide a first voltage; and
a second port of the plurality of ports disposed on the movable member is configured to provide a second voltage; and
a switch configured to turn off power to one of the first port, or the second port in response to the movable member retracting into the storage compartment.

14. A method for switching power to a platform module for a vehicle, the method comprising:
providing power to a plurality of ports disposed on a movable member;
detecting, based on a position sensor, a position of the movable member;
wherein:
providing power to a first port from the plurality of ports when the movable member is in a first position; and
providing power to a second port from the plurality of ports when the movable member is in a second position without providing power to the second port when the movable member is in the first position.

15. The method of claim 14, wherein the first port and the second port are configured to output different voltages.

16. The method of claim 14, further comprising:
providing power from a vehicle battery coupled to the first port and/or the second port;
monitoring, via a sensor, a battery storage level of the vehicle battery; and
turning off, via a control circuitry, the power to the second port in response to the battery storage level dropping below a threshold storage level.

17. The method of claim 16, further comprising:
monitoring, via a load usage sensor power consumption of the plurality of ports; and
turning off, via the control circuitry, the power to the first port based on the power consumption rate being greater than a threshold consumption rate and the battery storage level being less than the threshold storage level.

18. The method of claim 14, further comprising:
tracking by a proximity sensor a distance between a user and the vehicle; and
turning off, via a control circuitry, the power to the second port of the plurality of ports in response to the proximity sensor identifying that the distance is greater than a threshold distance.

19. The method of claim 14, further comprising:
monitoring a battery storage level at a vehicle battery;
turning off the power to the second port based on the battery storage level falling below a threshold first storage level; and
turning off power to the first port based on the battery storage level falling below a threshold second storage level.

20. The method of claim 14, further comprising:
transmitting by an electronic key fob a signal to the vehicle indicating a proximity of the electronic key fob to the vehicle; and
turning off, via a control circuitry, the power to the second port in response to a loss of signal from the electronic key fob.

* * * * *